United States Patent
Sudo et al.

(10) Patent No.: US 11,588,243 B2
(45) Date of Patent: Feb. 21, 2023

(54) ANTENNA MODULE AND COMMUNICATION APPARATUS EQUIPPED WITH THE SAME

(71) Applicant: Murata Manufacturing Co., Ltd., Kyoto (JP)

(72) Inventors: Kaoru Sudo, Kyoto (JP); Hirotsugu Mori, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 34 days.

(21) Appl. No.: 17/093,692

(22) Filed: Nov. 10, 2020

(65) Prior Publication Data
US 2021/0057820 A1 Feb. 25, 2021

Related U.S. Application Data

(63) Continuation of application No. PCT/JP2020/015660, filed on Apr. 7, 2020.

(30) Foreign Application Priority Data

Apr. 24, 2019 (JP) .............................. JP2019-082699

(51) Int. Cl.
*H01Q 9/04* (2006.01)
*H01Q 5/35* (2015.01)
(Continued)

(52) U.S. Cl.
CPC ................. *H01Q 5/35* (2015.01); *H01Q 1/52* (2013.01); *H04B 1/0475* (2013.01); *G16Y 10/75* (2020.01); *H01Q 1/243* (2013.01); *H04B 1/0057* (2013.01)

(58) Field of Classification Search
CPC .......... H01Q 1/52; H01Q 9/04; H01Q 9/0404; H01Q 9/0407; H01Q 5/30; H01Q 5/35; H01Q 5/45; H01Q 5/40; H04B 1/0475
See application file for complete search history.

(56) References Cited

U.S. PATENT DOCUMENTS 4,660,048 A 4/1987 Doyle
4,987,421 A 1/1991 Sunahara et al.
(Continued)

FOREIGN PATENT DOCUMENTS

JP S61-146003 A 7/1986
JP H02-113605 A 4/1990
(Continued)

OTHER PUBLICATIONS

Written Opinion for PCT/JP2020/015660 dated Jun. 23, 2020.
International Search Report for PCT/JP2020/015660 dated Jun. 23, 2020.

*Primary Examiner* — Blane J Jackson
(74) *Attorney, Agent, or Firm* — Pearne & Gordon LLP (57) ABSTRACT

An antenna module includes a dielectric substrate, a ground electrode, a power feeding element (121) and a power feeding element (122) each facing the ground electrode, and power feeding wirings (141) and (142). The power feeding wiring (141) transmits a radio frequency signal to a power feeding point (SP1) of the power feeding element (121). The power feeding wiring (142) transmits a radio frequency signal to a power feeding point (SP2) of the power feeding element (122). A frequency of a radio wave from the power feeding element (122) is higher than a frequency of a radio wave from the power feeding element (121). The power feeding wiring (142) includes a via rises from the ground electrode side to the power feeding element (122) at a position different from the power feeding point (SP2) and a wiring pattern that connects the via and the power feeding point (SP2).

10 Claims, 8 Drawing Sheets

(51) Int. Cl.
*H01Q 1/52* (2006.01)
*H04B 1/04* (2006.01)
G16Y 10/75 (2020.01)
H01Q 1/24 (2006.01)
H04B 1/00 (2006.01)

(56) References Cited

U.S. PATENT DOCUMENTS

| | | | | |
|---|---|---|---|---|
| 5,121,127 | A * | 6/1992 | Toriyama | H01Q 5/40 |
| | | | | 343/700 MS |
| 5,940,037 | A * | 8/1999 | Kellerman | H01Q 9/0414 |
| | | | | 343/700 MS |
| 2003/0146872 | A1 * | 8/2003 | Kellerman | H01Q 9/0414 |
| | | | | 343/700 MS |
| 2015/0333407 | A1 | 11/2015 | Yamagajo et al. | |
| 2017/0222316 | A1 | 8/2017 | Mizunuma et al. | |
| 2020/0161749 | A1 | 5/2020 | Onaka et al. | |

FOREIGN PATENT DOCUMENTS

| | | |
|---|---|---|
| JP | H05-347510 A | 12/1993 |
| JP | H07-288420 A | 10/1995 |
| JP | H08-195619 A | 7/1996 |
| JP | 2015-216577 A | 12/2015 |
| JP | 2018-082277 A | 5/2018 |
| WO | 2016/063759 A1 | 4/2016 |
| WO | 2018004611 A1 | 1/2018 |
| WO | 2019/026595 A1 | 2/2019 |

* cited by examiner

ANTENNA MODULE AND COMMUNICATION APPARATUS EQUIPPED WITH THE SAME

CROSS REFERENCE TO RELATED APPLICATION

This is a continuation of International Application No. PCT/JP2020/015660 filed on Apr. 7, 2020 which claims priority from Japanese Patent Application No. 2019-082699 filed on Apr. 24, 2019. The contents of these applications are incorporated herein by reference in their entireties.

BACKGROUND

Technical Field

The present disclosure relates to an antenna module and a communication apparatus equipped with the antenna module, and more particularly, to a technique for improving antenna characteristics of a multiband antenna module.

International Publication No. 2016/063759 (Patent Document 1) discloses an antenna module in which a power feeding element and a radio frequency semiconductor element are integrated and mounted on a dielectric substrate. Further, Patent Document 1 also discloses a configuration in which an electric power is not supplied from a radio frequency semiconductor element and a non-feeding element that is electromagnetically coupled to the power feeding element is further provided. Generally, it has been known that the non-feeding element is provided to thereby achieve a wider band of the antenna.

Patent Document 1: International Publication No. 2016/063759

BRIEF SUMMARY

In recent years, mobile terminals such as smartphones have become popular, and in addition, household appliances and electronic devices having a wireless communication function have been increasing due to technological innovation such as IoT. Accordingly, there is a concern that the communication traffic of the wireless network increases, and the communication speed and the communication quality decrease.

As one measure for solving such a problem, the development of the fifth generation mobile communication system (5G) has been progressing. In 5G, there is an object to perform high-speed beamforming and spatial multiplexing using a plurality of power feeding elements, and to achieve an increase in communication speed and an improvement in communication quality by using signals in a millimeter-wave band at a higher frequency (several 10 GHz) in addition to signals at frequencies in a 6 GHz band used in the related art.

In 5G, a frequency of a plurality of millimeter-wave bands in which frequency bands are away from each other may be used, and in this case, it is suitable to transmit and receive signals of the plurality of frequency bands by one antenna. Furthermore, it is also suitable to ensure isolation between signal transmission paths.

The present disclosure enables transmission and reception of a radio frequency signal in a plurality of frequency bands in an antenna module and improves isolation between signal transmission paths.

An antenna module according to an aspect of the present disclosure includes a dielectric substrate, a ground electrode disposed on the dielectric substrate, a first power feeding element and a second power feeding element each having a flat plate shape, and a first power feeding wiring and a second power feeding wiring. The first power feeding element and the second power feeding element are disposed so as to face the ground electrode. The first power feeding wiring transmits a radio frequency signal to a first power feeding point of the first power feeding element. The second power feeding wiring transmits a radio frequency signal to a second power feeding point of the second power feeding element. A frequency of a radio wave radiated from the second power feeding element is higher than a frequency of a radio wave radiated from the first power feeding element. The second power feeding wiring includes a first via that rises from the ground electrode side to the second power feeding element at a position different from the second power feeding point when the dielectric substrate is seen in a plan view, and a first wiring pattern that connects the first via and the second power feeding point.

An antenna module according to another aspect of the present disclosure includes a dielectric substrate, a ground electrode disposed on the dielectric substrate, and a first power feeding element and a second power feeding element each having a flat plate shape. The first power feeding element and the second power feeding element are disposed so as to face the ground electrode. A radio frequency signal is transmitted to the first power feeding element and the second power feeding element by individual power feeding wirings. A frequency of a radio wave radiated from the second power feeding element is higher than a frequency of a radio wave radiated from the first power feeding element. Inside the second power feeding element, a slit and a protruding portion protruding inside the slit are formed. The protruding portion is a part of the power feeding wiring for transmitting a radio frequency signal to the second power feeding element.

In the antenna module according to the present disclosure, power feeding wirings are provided for each of two power feeding elements having different resonant frequencies disposed facing each other. Accordingly, it is possible to transmit and receive the radio frequency signals in two frequency bands. Further, the power feeding wiring (second power feeding wiring) of the power feeding element (second power feeding element) on a high-frequency side is configured to include a via that rises up to the second power feeding element at a position different from a power feeding point (second power feeding point) of the second power feeding element, and a wiring pattern that connects the via and the second power feeding point. With this configuration, it is possible to weaken the coupling between two signal transmission paths as compared to a case where the via rises directly up to the second power feeding point, and thus it is possible to improve the isolation between the signal transmission paths.

DETAILED DESCRIPTION

Hereinafter, embodiments of the present disclosure will be described in detail with reference to the accompanying drawings. Note that the same or corresponding parts in the drawings are denoted by the same reference numerals, and the description thereof will not be repeated.

Embodiment 1

(Basic Configuration of Communication Apparatus)

Figure 1:
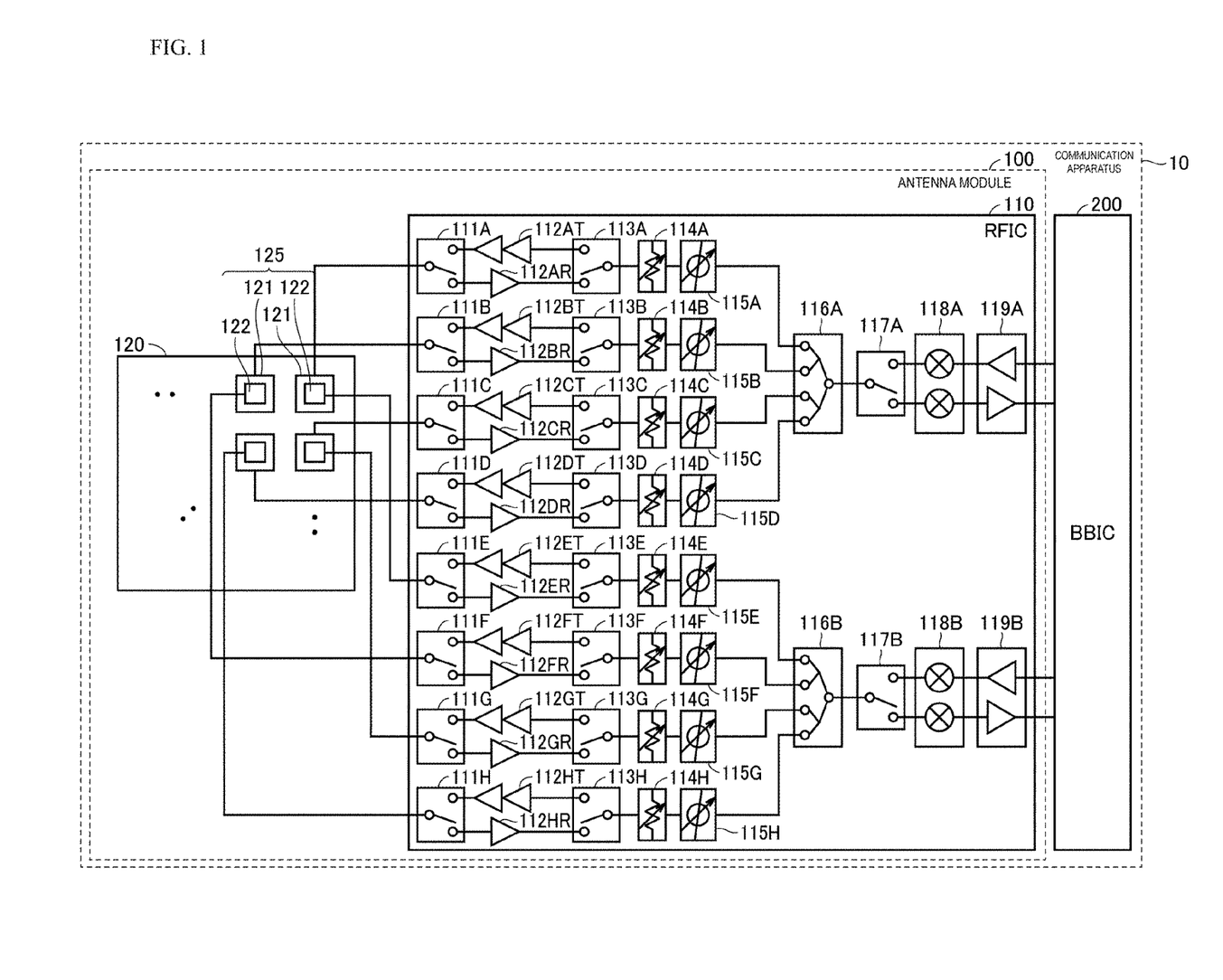
FIG. 1 is a block diagram of a communication apparatus to which an antenna module according to Embodiment 1 is applied.

FIG. 1 is a block diagram illustrating an example of a communication apparatus 10 to which an antenna module 100 according to Embodiment 1 is applied. The communication apparatus 10 is, for example, a mobile terminal such as a mobile phone, a smartphone, a tablet or the like, a personal computer having a communication function, or the like.

Referring to FIG. 1, the communication apparatus 10 includes the antenna module 100 and a BBIC 200 that configures a baseband signal processing circuit. The antenna module 100 includes an RFIC 110, which is an example of a power feeding circuit, and an antenna device 120. The communication apparatus 10 up-converts a signal transmitted from the BBIC 200 to the antenna module 100 into a radio frequency signal, radiates the signal from the antenna device 120, and down-converts a radio frequency signal received by the antenna device 120 to process the signal in BBIC 200.

In the antenna device 120 illustrated in FIG. 1, radiating elements 125 have configurations disposed in a two-dimensional array. Each of the radiating elements 125 includes two power feeding elements 121 and 122. The antenna device 120 is a so-called dual-band antenna device configured to be capable of radiating radio waves in different frequency bands from the power feeding element 121 and the power feeding element 122 of the radiating element 125. Different radio frequency signals are supplied to each of the power feeding elements 121 and 122 from the RFIC 110.

In FIG. 1, for ease of description, only the configurations corresponding to four radiating elements 125 among a plurality of radiating elements 125 included in the antenna device 120 are illustrated, and a configuration corresponding to another radiating element 125 having the same configuration is omitted. Note that the antenna device 120 does not necessarily have to be a two-dimensional array, and the antenna device 120 may be formed by one radiating element 125. In addition, a one-dimensional array may be adopted in which a plurality of radiating elements 125 is disposed in a row. In the present embodiment, the power feeding elements 121 and 122 included in the radiating element 125 are patch antennas each having a substantially square flat-plate shape.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, and signal multiplexers/demultiplexers 116A and 116B, mixers 118A and 118B, and amplifier circuits 119A and 119B. Among these, configurations of the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal multiplexer/demultiplexer 116A, the mixer 118A, and the amplifier circuit 119A are circuits for the radio frequency signals in a first frequency band radiated from the power feeding element 121. Further, configurations of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal multiplexer/demultiplexer 116B, the mixer 118B, and the amplifier circuit 119B are circuits for the radio frequency signals in a second frequency band radiated from the power feeding element 122.

When transmitting the radio frequency signals, the switches 111A to 111H and 113A to 113H are switched to the power amplifiers 112AT to 112HT side, and the switches 117A and 117B are connected to transmission side amplifiers of the amplifier circuits 119A and 119B, respectively. When receiving the radio frequency signals, the switches 111A to 111H and 113A to 113H are switched to the low noise amplifiers 112AR to 112HR side, and the switches 117A and 117B are connected to reception side amplifiers of the amplifier circuits 119A and 119B, respectively.

The signals transmitted from the BBIC 200 are amplified by the amplifier circuits 119A and 119B, and are up-converted in the mixers 118A and 118B. The transmission signal, which is an up-converted radio frequency signal, is demultiplexed by the signal multiplexers/demultiplexers 116A and 116B into four signals, and the signals pass through the corresponding signal path to be respectively fed to the different power feeding elements 121 and 122. Directivity of the antenna device 120 can be adjusted by individually adjusting degrees of phase shift of the phase shifters 115A to 115H disposed in the respective signal paths.

The reception signals that are the radio frequency signals received by each of the power feeding elements 121 and 122 are transmitted to the RFIC 110, and are multiplexed in the signal multiplexers/demultiplexers 116A and 116B via four signal paths that are different from one another. The multiplexed reception signals are down-converted in the mixers 118A and 118B, amplified in the amplifier circuits 119A and 119B, and transmitted to the BBIC 200.

The RFIC 110 is formed as, for example, a one-chip integrated circuit component including the above-described circuit configuration. Alternatively, devices (switches, power amplifiers, low noise amplifiers, attenuators, and phase shifters) corresponding to the respective radiating elements 125 in the RFIC 110 may be formed as the one-chip integrated circuit component for each corresponding radiating element 125.

(Configuration of Antenna Module)

Figure 2:
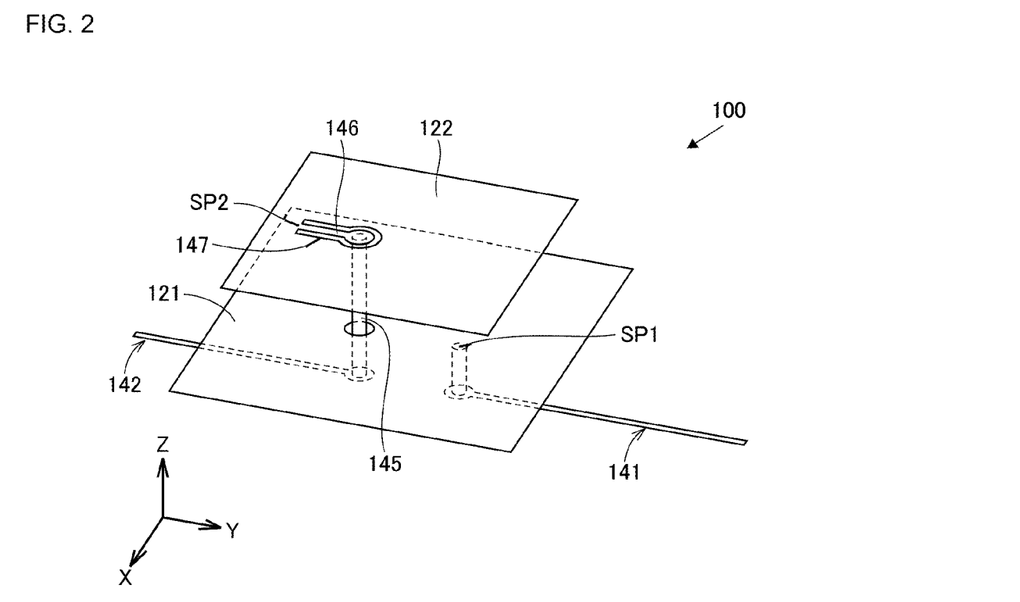
FIG. 2 is an external perspective view of the antenna module according to Embodiment 1.
Figure 3:
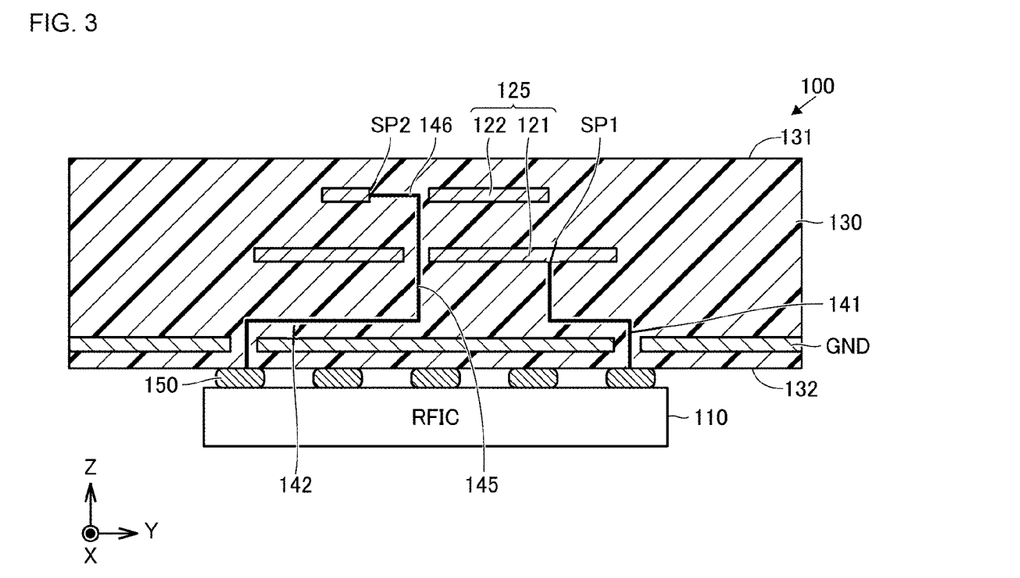
FIG. 3 is a cross-sectional perspective view of the antenna module according to Embodiment 1.

Next, the configuration of the antenna module 100 according to Embodiment 1 will be described in detail with reference to FIG. 2 and FIG. 3. FIG. 2 is an external perspective view of the antenna module 100. Further, FIG. 3 is a cross-sectional perspective view of the antenna module 100. In the following description, for ease of description, an antenna module in which one radiating element 125 is formed will be described as an example. Note that, as illustrated in FIG. 2 and FIG. 3, a thickness direction of the antenna module 100 is defined as a Z-axis direction, and a plane perpendicular to the Z-axis direction is defined by an X axis and a Y axis. In addition, a positive direction of the Z-axis in each figure may be referred to as an upper surface side, and a negative direction may be referred to as a lower surface side in some cases.

Referring to FIG. 2 and FIG. 3, the antenna module 100 includes a dielectric substrate 130, a ground electrode GND, and power feeding wirings 141 and 142 in addition to the RFIC 110 and the radiating element 125 (power feeding elements 121 and 122). Note that in FIG. 2, the RFIC 110, the ground electrode GND, and the dielectric substrate 130 are omitted.

The dielectric substrate 130 is formed of, for example, a low temperature co-fired ceramics (LTCC) multilayer substrate, a multilayer resin substrate formed by laminating a plurality of resin layers made of resin such as epoxy, polyimide, or the like, a multilayer resin substrate formed by laminating a plurality of resin layers made of a liquid crystal polymer (LCP) having a lower dielectric constant, a multilayer resin substrate formed by laminating a plurality of resin layers made of fluorine resin, or a ceramics multilayer substrate other than the LTCC. Note that the dielectric substrate 130 does not necessarily have multilayer structure, and may be a single-layer substrate.

The dielectric substrate 130 has a substantially rectangular shape in a plan view in a normal direction (Z-axis direction), and the power feeding element 122 is disposed so as to face the ground electrode GND on an upper surface 131 (surface in the positive direction of the Z-axis) side. The power feeding element 122 may be exposed to a surface of the dielectric substrate 130, or may be disposed in an inner layer of the dielectric substrate 130 as illustrated in the example of FIG. 3.

The power feeding element 121 is disposed so as to face the ground electrode GND in a layer closer to the ground electrode GND than the power feeding element 122. In other words, the power feeding element 121 is disposed in a layer between the power feeding element 122 and the ground electrode GND. The power feeding element 121 overlaps the power feeding element 122 when the dielectric substrate 130 is seen in a plan view. The size of the power feeding element 122 is smaller than the size of the power feeding element 121, and a resonant frequency of the power feeding element 122 is higher than a resonant frequency of the power feeding element 121. That is, the frequency of the radio wave radiated from the power feeding element 122 is higher than the frequency of the radio wave radiated from the power feeding element 121. For example, the frequency of the radio wave radiated from the power feeding element 121 is 28 GHz, and the frequency of the radio wave radiated from the power feeding element 122 is 39 GHz.

The RFIC 110 is mounted on a lower surface 132 of the dielectric substrate 130 via a solder bump 150. Note that, instead of the solder connection, the RFIC 110 may be connected to the dielectric substrate 130 by using a multipolar connector.

A radio frequency signal is transmitted to the power feeding element 121 from the RFIC 110 via the power feeding wiring 141. The power feeding wiring 141 penetrates through the ground electrode GND from the RFIC 110 and is connected to a power feeding point SP1 from a lower surface side of the power feeding element 121. That is, the power feeding wiring 141 transmits a radio frequency signal to the power feeding point SP1 of the power feeding element 121.

A radio frequency signal is transmitted to the power feeding element 122 from the RFIC 110 via the power feeding wiring 142. The power feeding wiring 142 penetrates through the ground electrode GND and the power feeding element 121 from the RFIC 110, and is connected to a power feeding point SP2 of the power feeding element 122. The power feeding wiring 142 includes a via 145 that penetrates through the power feeding element 121 and a wiring pattern 146 that is formed in a layer in which the power feeding element 122 is disposed. When the dielectric substrate 130 is seen in a plan view, the via 145 rises from the ground electrode GND side to the layer in which the power feeding element 122 is disposed at a position different from the power feeding point SP2, and the via 145 and the power feeding point SP2 are connected by the wiring pattern 146. That is, the power feeding wiring 142 transmits a radio frequency signal to the power feeding point SP2 of the power feeding element 122.

The power feeding point SP1 of the power feeding element 121 is disposed at a position offset from the center of the power feeding element 121 in a positive direction of the Y axis. Further, the power feeding point SP2 of the power feeding element 122 is disposed at a position offset from the center of the power feeding element 122 in a negative direction of the Y axis. As such, radio waves having a polarization direction in the Y-axis direction are radiated from each of the power feeding elements 121 and 122.

Note that as illustrated in FIG. 3, the wiring pattern 146 is formed as a protruding portion that protrudes in a slit 147 extending in the polarization direction (Y-axis direction) formed in the power feeding element 122 in the actual manufacturing process. That is, the protruding portion is a part of the power feeding wiring 142. The vicinity of a connection position between the protruding portion and the power feeding element 122 serves as the power feeding point SP2 of the power feeding element 122. Then, the via 145 is connected to a protruding end portion (a portion on an open end side) of the protruding portion, and the radio frequency signal is transmitted.

In this way, in a so-called stacked antenna module in which two power feeding elements (first power feeding element, second power feeding element) are laminated, in a case of a configuration in which a radio frequency signal is transmitted to the two power feeding elements by individual power feeding wirings, and the power feeding wiring to the second power feeding element penetrates through the first power feeding element, coupling may occur between the first power feeding element and the power feeding wiring penetrating therethrough. Then, the radio frequency signal to be radiated from the first power feeding element may leak to a signal transmission path for the second power feeding element, and isolation between two signal transmission paths may be reduced.

In Embodiment 1, the via 145 of the power feeding wiring 142 penetrates through the power feeding element 121 on a low-frequency side on an inner side relative to the power feeding point SP2 of the power feeding element 122 (the center side of the power feeding element 122), and is connected to the power feeding point SP2 by the wiring pattern 146 in the layer in which the power feeding element 122 is disposed.

Strength of electric field coupling between the power feeding element 121 and the power feeding element 122 tends to be strong at an end at which the current density is high. In other words, the closer to the center of the power feeding element 121, the weaker an intensity of electric field becomes. Therefore, as the position of the power feeding wiring 142 passing between the power feeding elements is close to the center of the power feeding element 121, the coupling between the via 145 of the power feeding wiring 142 and the power feeding element 121 becomes weak. Accordingly, as in Embodiment 1, by disposing the via 145 of the power feeding wiring 142 to the power feeding element 122 on the inner side relative to the power feeding point SP2, it is possible to improve the isolation between the signal transmission paths, as compared to a case where the via is connected from right below the power feeding point SP2.

Figure 4:
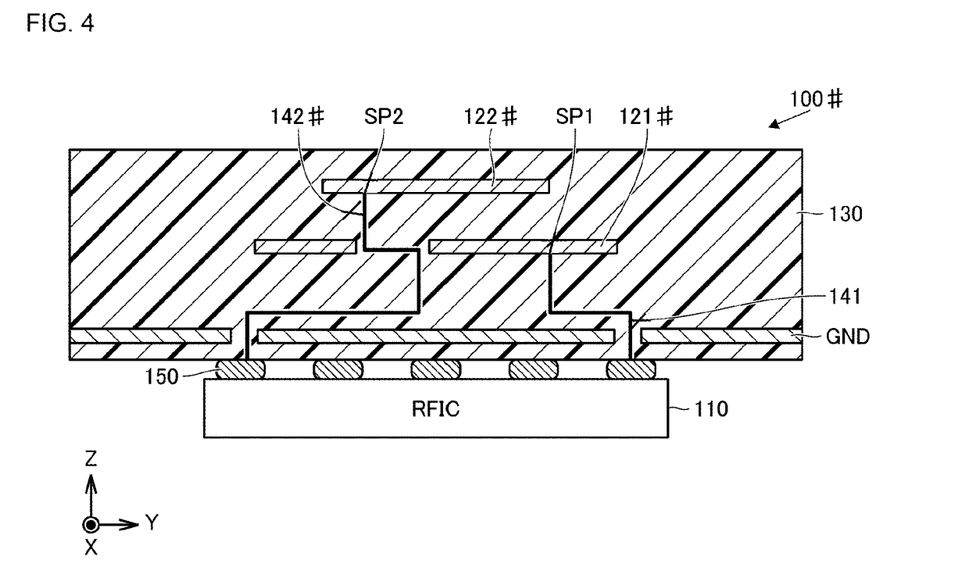
FIG. 4 is a cross-sectional perspective view of an antenna module of a comparative example.

FIG. 4 is a cross-sectional perspective view of an antenna module 100 # according to a comparative example. In the antenna module 100 #, a power feeding wiring 142 # for transmitting a radio frequency signal to a power feeding element 122 # rises from the ground electrode GND side to a layer in which a power feeding element 121 # is disposed, is offset toward an outer side at the layer in which the power feeding element 121 # is disposed, and is connected to the power feeding element 122 # from the right below the power feeding point SP2 of the power feeding element 122 #. The other parts have the same configuration as in Embodiment 1 of FIG. 3, and description of the overlapping elements will not be repeated.

Figure 5:
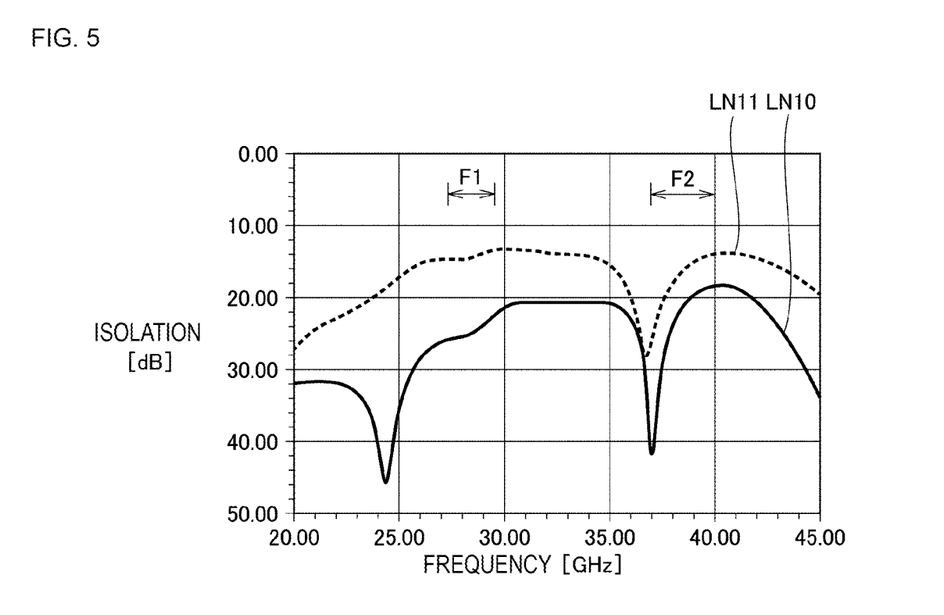
FIG. 5 is a diagram illustrating isolation characteristics in Embodiment 1 and the comparative example.

Next, antenna characteristics of the antenna module 100 # of the comparative example and the antenna module 100 of Embodiment 1 will be described with reference to FIG. 5 and FIG. 6. FIG. 5 is a diagram illustrating isolation characteristics between the power feeding wiring 141 and the power feeding wiring 142 in Embodiment 1 and the comparative example, and FIG. 6 is a diagram illustrating antenna gains in Embodiment 1 and the comparative example.

Referring to FIG. 5, in FIG. 5, a horizontal axis represents the frequency, and a vertical axis represents the isolation (solid line LN10) in a case of Embodiment 1 and the isolation (dashed line LN11) in a case of the comparative example. Note that, in FIG. 5, F1 indicates a frequency band of the power feeding element 121, and F2 indicates a frequency band of the power feeding element 122.

As seen from FIG. 5, the isolation of Embodiment 1 is larger than that of the comparative example. That is, in Embodiment 1, the isolation between the two signal transmission paths is improved compared to the comparative example.

Figure 6:
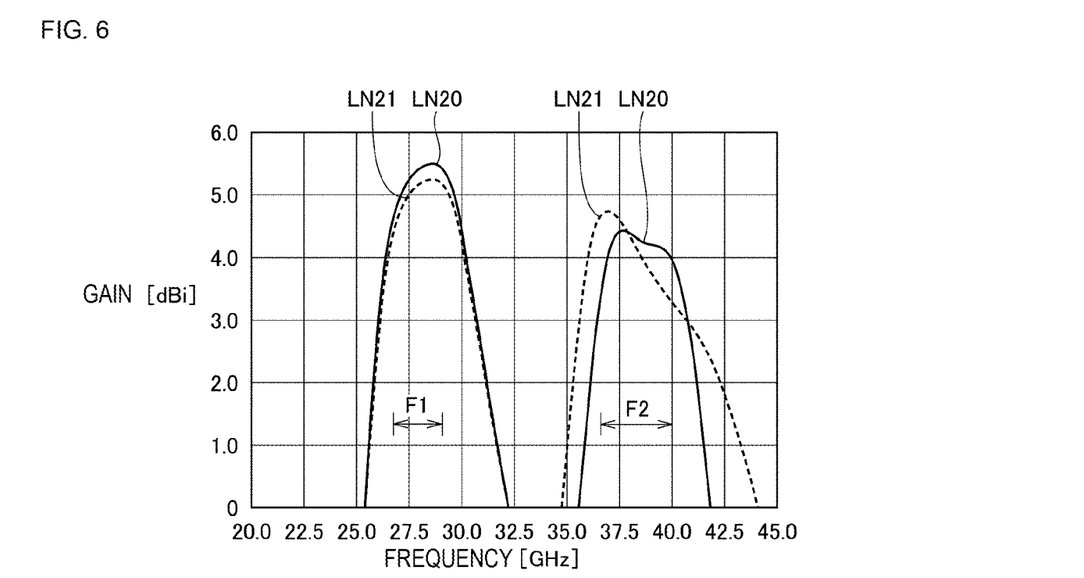
FIG. 6 is a diagram illustrating gains in Embodiment 1 and the comparative example.

As for the antenna gain of FIG. 6, the gain is improved over the entire area in a frequency band F1 of the power feeding element 121 in Embodiment 1 than the comparative example. In addition, in a frequency band F2 of the power feeding element 122, the gain on the high-frequency side in Embodiment 1 is particularly improved, and a uniform gain is achieved over the entire area of the frequency band F2 compared to the comparative example.

As described above, in Embodiment 1, in the stacked antenna module having two power feeding elements to which power is individually fed, the power feeding wiring for the power feeding element (second power feeding element) on the high-frequency side penetrating through the power feeding element (first power feeding element) on the low-frequency side rises on the inner side relative to the power feeding point of the second power feeding element, and further is connected to the power feeding point by being offset to the outer side in the layer in which the second power feeding element is disposed. With such a configuration, it is possible to transmit and receive the radio frequency signals in two frequency bands. Further, since the coupling between two signal transmission paths can be weakened, the isolation between the two signal transmission paths can be improved.

Note that the "power feeding element 121" and the "power feeding element 122" in Embodiment 1 correspond to the "first power feeding element" and the "second power feeding element" in the present disclosure, respectively. The "power feeding wiring 141" and the "power feeding wiring 142" in Embodiment 1 correspond to the "first power feeding wiring" and the "second power feeding wiring" in the present disclosure, respectively. The "power feeding point SP1" and the "power feeding point SP2" in Embodiment 1 correspond to the "first power feeding point" and the "second power feeding point" in the present disclosure, respectively. The "via 145" and the "wiring pattern 146" according to Embodiment 1 correspond to the "first via" and the "first wiring pattern" in the present disclosure, respectively.

(Modification 1)

In the antenna module 100 of Embodiment 1, the configuration in which the wiring pattern 146 is formed in the layer in which the power feeding element 122 on the high-frequency side is disposed has been described, but the wiring pattern for the offset may be formed on the surface (upper surface) 131 side of the dielectric substrate 130 relative to the power feeding element 122.

Figure 7:
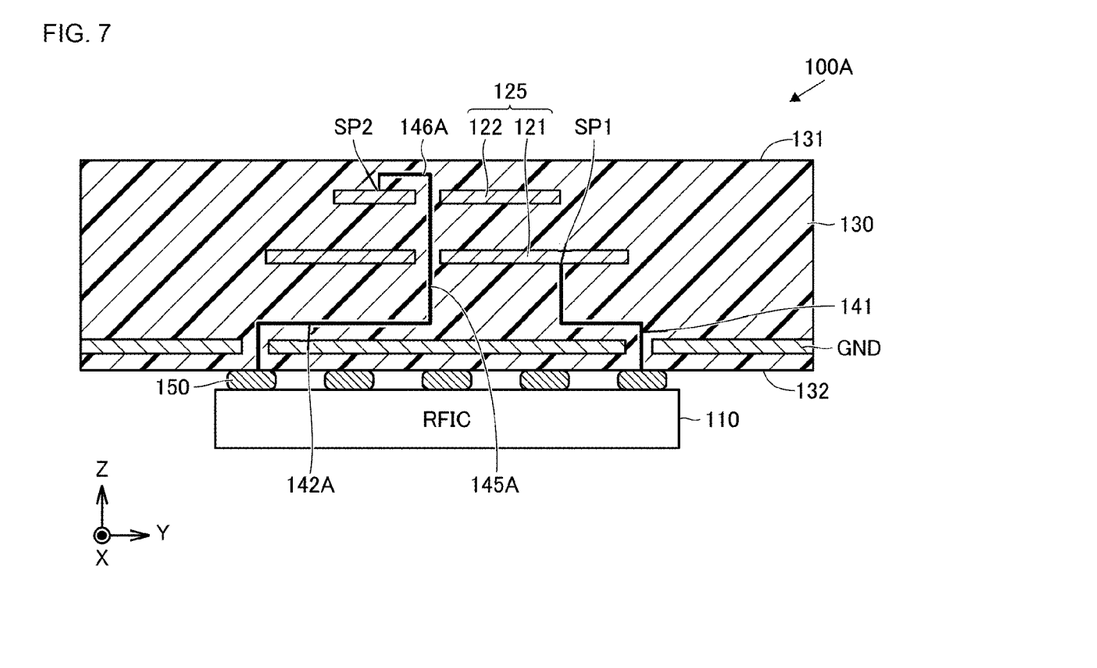
FIG. 7 is a cross-sectional perspective view of an antenna module according to Modification 1.

In an antenna module 100A according to Modification 1 illustrated in FIG. 7, a power feeding wiring 142A for transmitting the radio frequency signal to the power feeding element 122 on the high-frequency side penetrates through the power feeding element 121 and the power feeding element 122 from the ground electrode GND side by a via 145A, rises up to the layer between the upper surface 131 of the dielectric substrate 130 and the power feeding element 122, and is connected to the power feeding point SP2 by being offset to an outer side of the power feeding element 122 by a wiring pattern 146A.

Also, in such a configuration, since a position of the power feeding wiring 142A passing between the power feeding elements is located on an inner side relative to the power feeding point SP2, it is possible to improve the isolation between two signal transmission paths.

(Modification 2)

Figure 8:
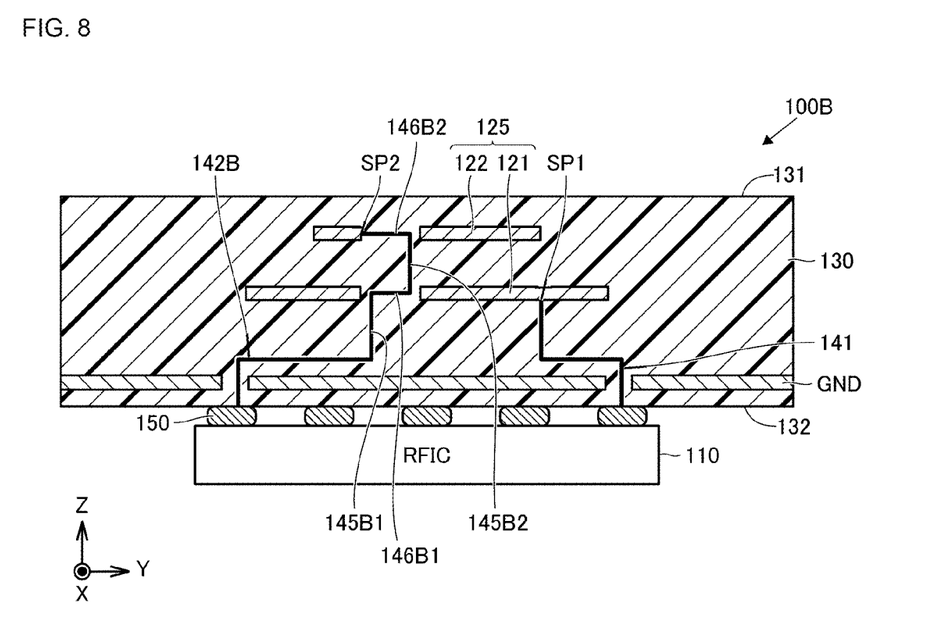
FIG. 8 is a cross-sectional perspective view of an antenna module according to Modification 2.

FIG. 8 is a cross-sectional perspective view of an antenna module 100B according to Modification 2. In the antenna module 100B, a power feeding wiring 142B for transmitting the radio frequency signal to the power feeding element 122 on the high-frequency side firstly rises from the ground electrode GND side to the layer in which the power feeding element 121 is disposed by a via 145B1, and is offset to an inner side of the power feeding element 121 by a wiring pattern 146B1. Then, the power feeding wiring 142B rises further from there to a layer in which the power feeding element 122 is disposed by a via 145B2, and is connected to the power feeding point SP2 by being offset to the outer side of the power feeding element 122 by the wiring pattern 146B2.

In Modification 2, the power feeding wiring 142B does not penetrate through the power feeding element 121 by a series of vias, but is temporarily offset inward in the layer in which the power feeding element 121 is disposed. Therefore, the coupling between the power feeding element 121 and the wiring pattern 146B1 is slightly increased, but the via 145B2 passing between the power feeding element 121 and the power feeding element 122 is disposed on the inner side relative to the power feeding point SP2, and thus it is possible to weaken the coupling between the two signal transmission paths. This makes it possible to improve the isolation between the two signal transmission paths.

Embodiment 2

In Embodiment 1, a description has been made of the configuration in which the power feeding wiring for transmitting the radio frequency signal to the power feeding element on the high-frequency side is offset from the inner side of the power feeding element to the outer side in the layer in which the power feeding element is disposed. In Embodiment 2, a configuration in which a power feeding wiring in a layer in which a power feeding element on a high-frequency side is disposed is offset from an outer side toward an inner side will be described.

Figure 9:
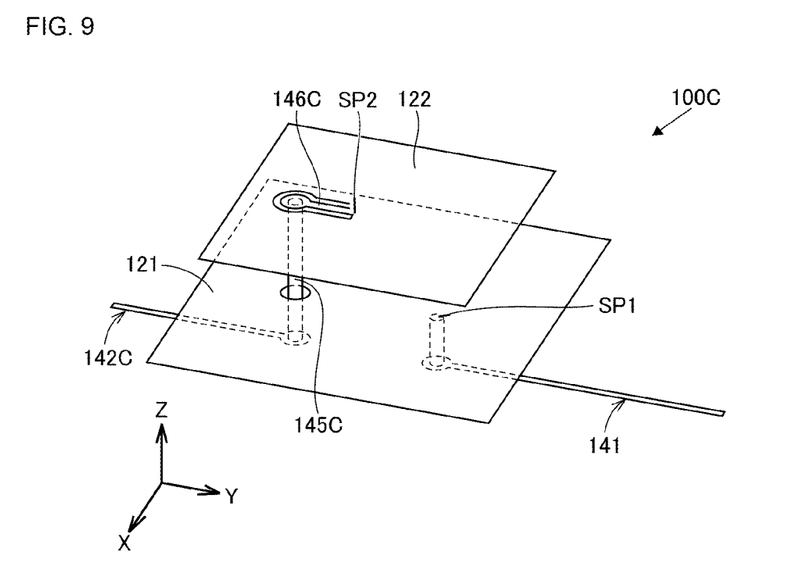
FIG. 9 is an external perspective view of an antenna module according to Embodiment 2.
Figure 10:
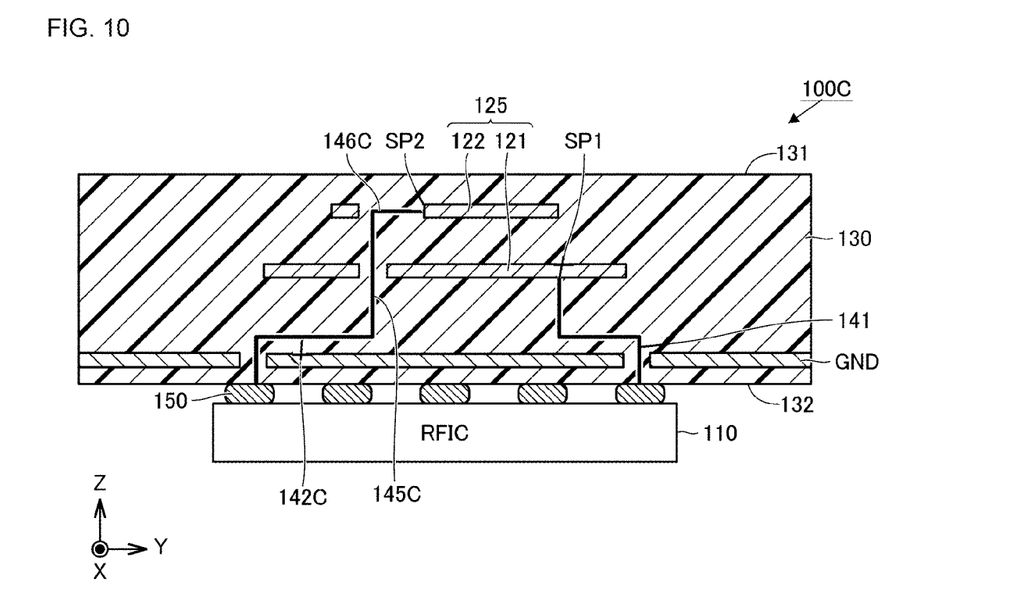
FIG. 10 is a cross-sectional perspective view of the antenna module according to Embodiment 2.

FIG. 9 is an external perspective view of an antenna module 100C according to Embodiment 2. Further, FIG. 10 is a cross-sectional perspective view of the antenna module 100C. As illustrated in FIG. 9 and FIG. 10, a power feeding wiring 142C for transmitting a radio frequency signal to the power feeding element 122 rises to a layer in which the power feeding element 122 is disposed by penetrating through the power feeding element 121 by a via 145C, and is connected to the power feeding point SP2 by being offset to the inner side of the power feeding element 122 in the layer in which the power feeding element 122 is disposed.

In this configuration, since coupling between a spatial transmission mode between the power feeding element 121 and the power feeding element 122 and the radio frequency signal transmitting a wiring pattern 146C becomes weak, it is possible to weaken the coupling between two signal transmission paths through the transmission between the power feeding element 121 and the power feeding element 122. Therefore, it is possible to improve isolation between the signal transmission paths.

Embodiment 3

In Embodiment 1 and Embodiment 2, the case of the antenna module of a single polarization type having one polarization direction of the radio waves radiated from each of the power feeding elements has been described.

In Embodiment 3, a description will be given of a case of a dual-polarized antenna module in which radio waves in two polarization directions orthogonal to each other are radiated from each of the power feeding elements.

Figure 11:
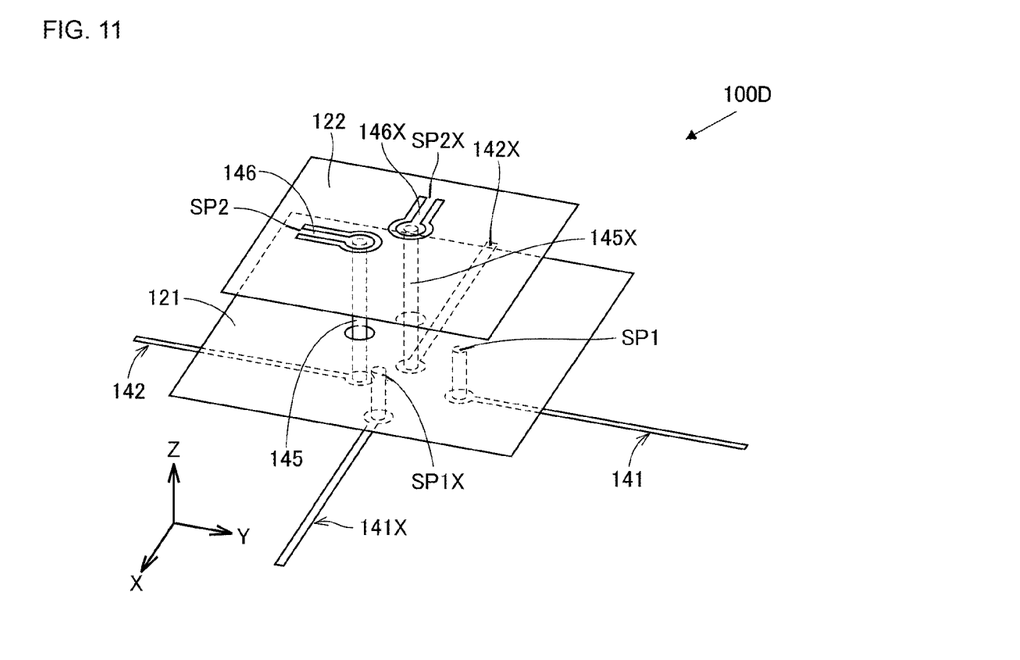
FIG. 11 is an external perspective view of an antenna module according to Embodiment 3.

FIG. 11 is an external perspective view of an antenna module 100D according to Embodiment 3. Referring to FIG. 11, in the antenna module 100D, in addition to a configuration in which the radio waves having the polarization direction in a Y-axis direction are radiated from each of the power feeding elements as in Embodiment 1, a configuration is provided in which the radio waves having the polarization direction in an X-axis direction are also radiated from each of the power feeding elements.

More specifically, the antenna module 100D further includes, in addition to the configuration of the antenna module 100, a power feeding wiring 141X for transmitting a radio frequency signal to the power feeding element 121, and a power feeding wiring 142X for transmitting a radio frequency signal to the power feeding element 122.

The power feeding wiring 141X penetrates through the ground electrode GND from the RFIC 110, and is connected to a power feeding point SP1X from a lower surface side of the power feeding element 121. The power feeding point SP1X is disposed at a position offset from the center of the power feeding element 121 in a positive direction of the X axis. As such, by supplying the radio frequency signal via the power feeding wiring 141X, radio waves having the polarization direction in the X-axis direction are radiated from the power feeding element 121.

The power feeding wiring 142X penetrates through the ground electrode GND and the power feeding element 121 from the RFIC 110, and is connected to a power feeding point SP2X of the power feeding element 122. The power feeding wiring 142X includes a via 145X penetrating through the power feeding element 121 and a wiring pattern 146X formed in a layer in which the power feeding element 122 is disposed. When the dielectric substrate 130 is seen in a plan view, the via 145X rises from the ground electrode GND side to the layer in which the power feeding element 122 is disposed at a position different from the power feeding point SP2X, and the via 145X and the power feeding point SP2X are connected by the wiring pattern 146X. The power feeding point SP2X is disposed at a position offset from the center of the power feeding element 122 in a negative direction of the X-axis. As such, by supplying the radio frequency signal via the power feeding wiring 142X, radio waves having the polarization direction in the X-axis direction are radiated from the power feeding element 122. The wiring pattern 146X extends in the X-axis direction which is the polarization direction.

Also in the dual-polarized antenna module of Embodiment 3, with a configuration in which a power feeding wiring for a power feeding element on the high-frequency side rises on an inner side relative to the power feeding point, and further is connected to the power feeding point by being offset to an outer side in the layer in which the power feeding element is disposed, it is possible to transmit and receive the radio frequency signals in two frequency bands, and also to improve isolation between two signal transmission paths.

Note that the "power feeding wiring 141X" and the "power feeding wiring 142X" in Embodiment 3 correspond to the "third power feeding wiring" and the "fourth power feeding wiring" in the present disclosure, respectively. The "power feeding point SP1X" and the "power feeding point SP2X" in Embodiment 3 correspond to the "third power feeding point" and the "fourth power feeding point" in the present disclosure, respectively. The "via 145X" and the "wiring pattern 146X" according to Embodiment 3 correspond to the "second via" and the "second wiring pattern" in the present disclosure, respectively.

(Modification 3)

In Modification 3, a description will be given of a configuration in which, by disposing a stub in each power feeding wiring, a frequency band width of the radio waves transmitted and received in each power feeding element is expanded.

Figure 12:
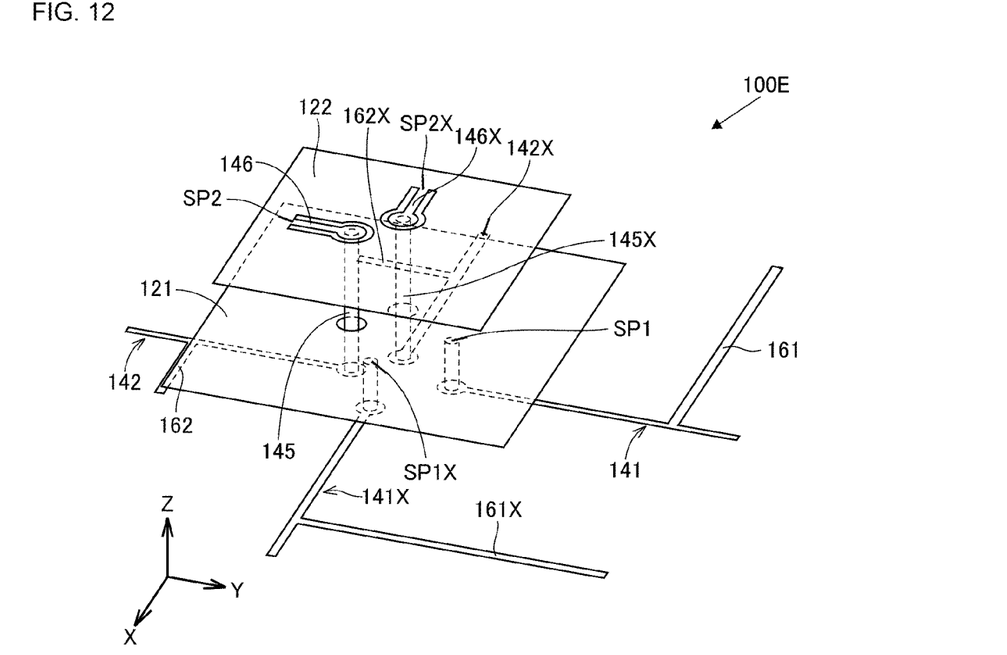
FIG. 12 is an external perspective view of an antenna module according to Modification 3.

FIG. 12 is an external perspective view of an antenna module 100E according to Modification 3. In the antenna module 100E, in addition to the configuration of the antenna module 100D according to Embodiment 3, a stub having a length corresponding to the frequency of the radio wave to be radiated from each of the power feeding wirings is provided. Note that each stub may be a short stub, or may be an open stub.

More specifically, in the power feeding wiring 141 and the power feeding wiring 141X, a stub 161 and a stub 161X are respectively disposed in the wiring pattern extending in the layer between the power feeding element 121 and the ground electrode GND. The lengths of the stubs 161 and 161X are set to, for example, ¼ of a wave length corresponding to the frequency (28 GHz) of the radio wave radiated from the power feeding element 121.

In addition, in the power feeding wiring 142 and the power feeding wiring 142X, a stub 162 and a stub 162X are respectively disposed in the wiring pattern extending to the layer between the power feeding element 121 and the ground electrode GND. The lengths of the stubs 162 and 162X are set to, for example, ¼ of a wave length corresponding to the frequency (39 GHz) of the radio wave radiated from the power feeding element 122.

As described above, by disposing the stub corresponding to the frequency of the radio frequency signal to be radiated in each of the power feeding wirings to improve matching with the power feeding element, it is possible to expand the frequency band of the radio waves that can be transmitted and received.

(Modification 4)

In Modification 4, a configuration in which a stub for removing an influence of the signal in the other frequency band is added to each of the power feeding wirings of the antenna module 100E illustrated in FIG. 12 will be described.

Figure 13:
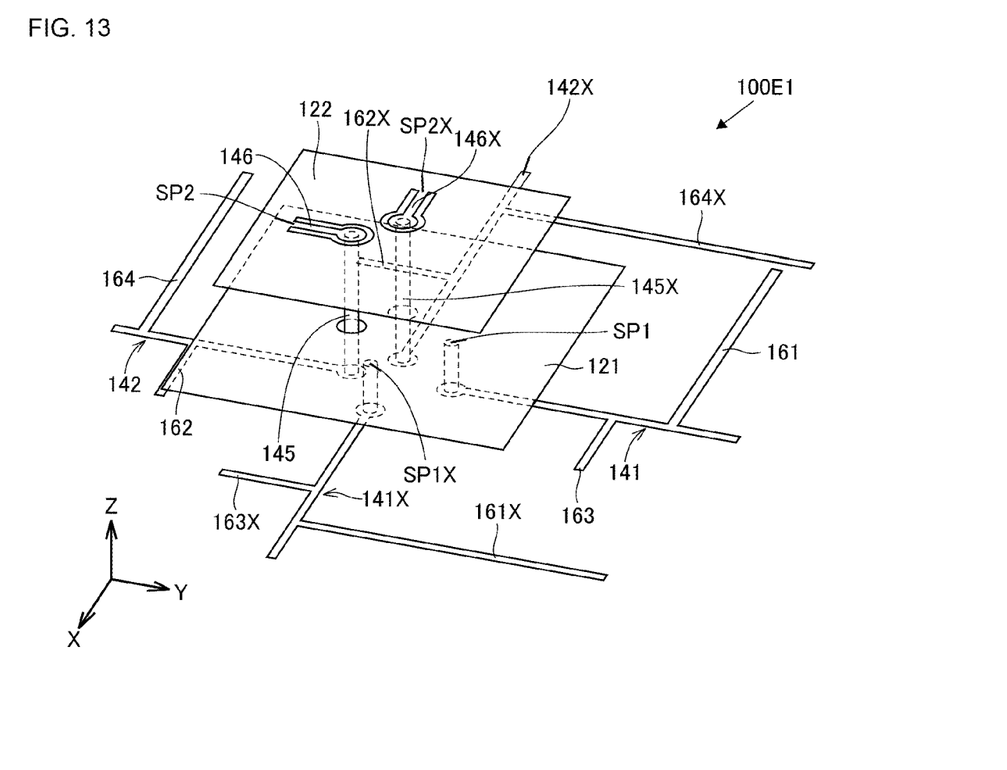
FIG. 13 is an external perspective view of an antenna module according to Modification 4.

FIG. 13 is an external perspective view of an antenna module 100E1 according to Modification 4. In the antenna module 100E1, stubs 163 and 163X are added to the power feeding wirings 141 and 141X corresponding to the power feeding element 121 on the low-frequency side, respectively. The stubs 163 and 163X are set to have lengths (for example, ¼ wave length) corresponding to the frequency (39 GHz) of the radio wave radiated from the power feeding element 122 on the high-frequency side.

Also, stubs 164 and 164X are also added to the power feeding wirings 142 and 142X corresponding to the power feeding element 122 on the high-frequency side. The stubs 164 and 164X are set to have lengths (for example, ¼ wave length) corresponding to the frequency (28 GHz) of the radio wave radiated from the power feeding element 121 on the low-frequency side.

Here, in general, the stub disposed in the transmission path may be used for improving the matching with the power feeding element as in Modification 3, but by adjusting the position of the stub in the transmission path, it is also possible to cause the stub to function as a notch filter for removing a signal component at a specific frequency of the signal transmitted to the transmission path.

In Modification 4, the stubs 163, 163X, 164, and 164X are disposed in positions that function as a notch filter in the corresponding power feeding wiring. Accordingly, the stubs 163 and 163X remove the signal components on the high-frequency side (39 GHz) in the radio frequency signals transmitted by the power feeding wirings 141 and 141X. Further, the stubs 164 and 164X remove the signal components on the low frequency side (28 GHz) in the radio frequency signals transmitted by the power feeding wirings 142 and 142X.

As described above, in a dual-band antenna module, by disposing the stub having the length corresponding to the frequency band of the power feeding element on the other side to each power feeding wiring, it is possible to remove the signal component in the frequency band on the other side in the radio frequency signal transmitted by the power feeding wiring. This makes it possible to improve the isolation of the radio waves radiated from two power feeding elements.

Note that, in Modifications 3 and 4, the length of each stub is not necessarily limited to the ¼ wave length of a target radio wave. For example, the length of the stub may be ½ of the wave length of the target radio wave. Alternatively, the length may be set to a length slightly deviated from the ¼ wave length (or ½ wave length) by adjusting the position of the stub.

Embodiment 4

In Embodiments 1 to 3, examples of the stacked antenna module in which two power feeding elements are laminated have been described.

In Embodiment 4, an antenna module in which two power feeding elements are disposed in the same layer will be described.

Figure 14A:
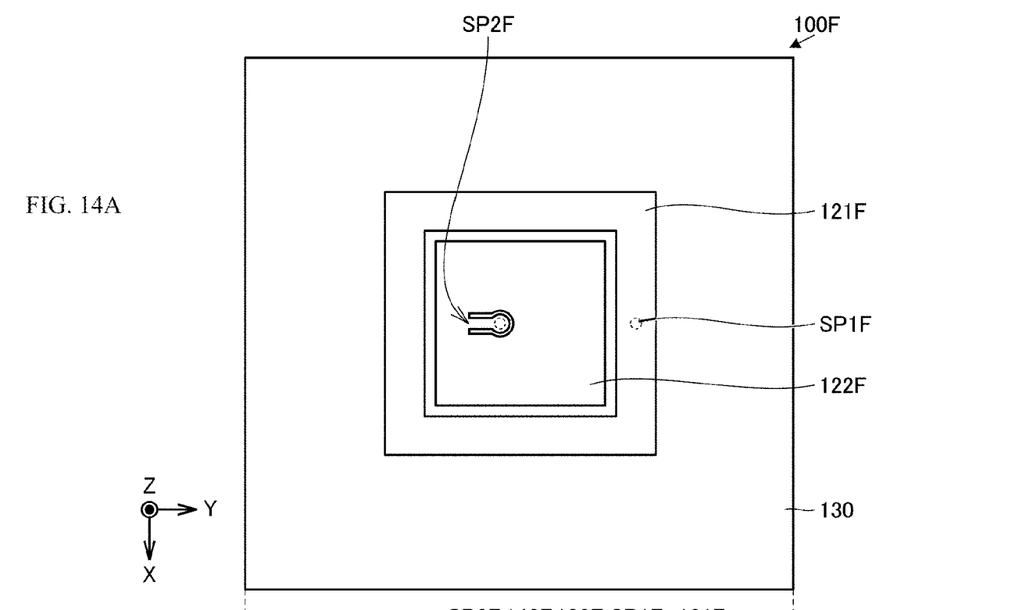
FIG. 14A is a plan view and FIG. 14B is a side perspective view of an antenna module according to Embodiment 4.
Figure 14B:
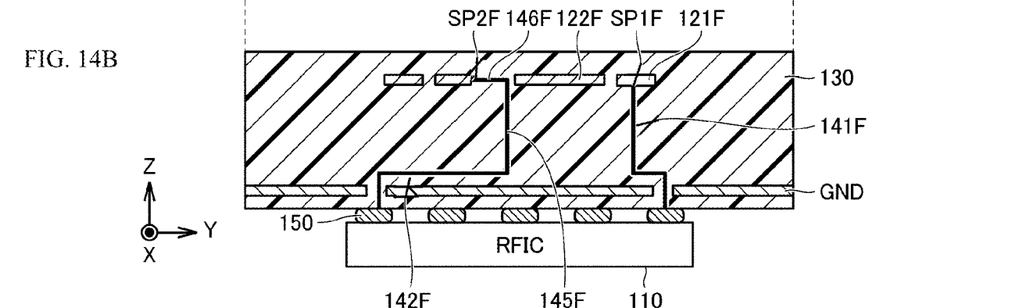

FIGS. 14A and 14B are diagrams for describing an antenna module 100F according to Embodiment 4. In FIGS. 14A and 14B, a plan view of the antenna module 100F is illustrated in FIG. 14A, and a side perspective view of the antenna module 100F is illustrated in FIG. 14B.

Referring to FIGS. 14A and 14B, in the antenna module 100F, a power feeding element 121F on the low-frequency side is disposed so as to surround a power feeding element 122F on the high-frequency side having a rectangular shape. In the antenna module 100F, the power feeding element 121F and the power feeding element 122F are disposed in the same layer.

A radio frequency signal is transmitted from the RFIC 110 to the power feeding element 121F via a power feeding wiring 141F. The power feeding wiring 141F penetrates through a ground electrode GND from the RFIC 110, and is connected to a power feeding point SP1F from a lower surface side of the power feeding element 121F. That is, the power feeding wiring 141F transmits the radio frequency signal to the power feeding point SP1F of the power feeding element 121F.

A radio frequency signal is transmitted from the RFIC 110 to the power feeding element 122F via a power feeding wiring 142F. The power feeding wiring 142F penetrates through the ground electrode GND from the RFIC 110, and is connected to a power feeding point SP2F of the power feeding element 122F. The power feeding wiring 142F includes a via 145F that rises from the ground electrode GND side to a layer in which the power feeding element 122F is disposed, and a wiring pattern 146F formed in the layer in which the power feeding element 122 is disposed. When the dielectric substrate 130 is seen in a plan view, the via 145F rises from the ground electrode GND side to the layer in which the power feeding element 122 is disposed at a position (a position on an inner side of the power feeding element 122F relative to the power feeding point SP2F) different from the power feeding point SP2F, and the via 145F and the power feeding point SP2F are connected by the wiring pattern 146F. That is, the power feeding wiring 142F transmits the radio frequency signal to the power feeding point SP2F of the power feeding element 122F.

The power feeding point SP1F of the power feeding element 121F is disposed at a position offset from the center of the power feeding element 121F in a positive direction of a Y axis. Further, the power feeding point SP2F of the power feeding element 122F is disposed at a position offset from the center of the power feeding element 122F in a negative direction of the Y axis. As a result, radio waves having a polarization direction in a Y-axis direction are radiated from each of the power feeding elements 121F and 122F. The wiring pattern 146F extends in the polarization direction (Y-axis direction).

As in the antenna module 100F, in the configuration in which the power feeding element 121F is disposed around the power feeding element 122F, when the power feeding wiring 142F rises at a position close to an end portion of the power feeding element 122F, the distance between the power feeding wiring 142F and the power feeding element 121F becomes close to each other, and therefore, coupling is likely to occur. In the antenna module 100F, the power feeding wiring 142F is raised on an inner side (a position close to the center) of the power feeding element 122F, and the power feeding element 122F is offset in the layer in which the power feeding element is disposed, thereby securing a separation distance between the power feeding wiring 142F and the power feeding element 121F. This makes it possible to suppress the coupling between the power feeding wiring 142F and the power feeding element 121F, and thus it is possible to improve the isolation between two signal transmission paths.

Note that the "power feeding element 121F" and the "power feeding element 122F" in Embodiment 4 correspond to the "first power feeding element" and the "second power feeding element" in the present disclosure, respectively. The "power feeding wiring 141F" and the "power feeding wiring 142F" in Embodiment 4 correspond to the "first power feeding wiring" and the "second power feeding wiring" in the present disclosure, respectively. The "power feeding point SP1F" and the "power feeding point SP2F" in Embodiment 4 correspond to the "first power feeding point" and the "second power feeding point" in the present disclosure, respectively. The "via 145F" and the "wiring pattern 146F" according to Embodiment 4 correspond to the "first via" and the "first wiring pattern" in the present disclosure, respectively.

Note that, in the above-described embodiments and modifications, the configuration in which the radiating element and the ground electrode are formed on the same dielectric substrate has been described, however, a configuration in which the radiating element and the ground electrode are respectively formed on different substrates may be adopted. In this case, the power feeding wiring between two substrates is connected to each other by using a connection electrode or a cable.

It should be considered that the embodiments disclosed herein are illustrative in all respects and are not restrictive. The scope of the present disclosure is indicated by the claims rather than the description of the above-described embodiments, and it is intended to include all modifications within the meaning and scope equivalent to the scope of the claims.

REFERENCE SIGNS LIST

10 COMMUNICATION APPARATUS
100, 100A to 100F, 100E1 ANTENNA MODULE
110 RFIC
111A to 111H, 113A to 113H, 117A, 117B SWITCH
112AR to 112HR LOW NOISE AMPLIFIER
112AT to 112HT POWER AMPLIFIER
114A to 114H ATTENUATOR
115A to 115H PHASE SHIFTER
116A, 116B SIGNAL MULTIPLEXER/DEMULTIPLEXER
118A, 118B MIXER
119A, 119B AMPLIFIER CIRCUIT
120 ANTENNA DEVICE
121, 121F, 122, 122F POWER FEEDING ELEMENT
125 RADIATING ELEMENT
130 DIELECTRIC SUBSTRATE
131 UPPER SURFACE
132 LOWER SURFACE
141, 141F, 141X, 142, 142A to 142C, 142F, 142X POWER FEEDING WIRING
145, 145A, 145B1, 145B2, 145C, 145F, 145X VIA
146, 146A, 146B1, 146B2, 146C, 146F, and 146X WIRING PATTERN
147 SLIT
150 SOLDER BUMP
161, 161X, 162, 162X, 163, 163X, 164, 164X STUB
200 BBIC GND GROUND ELECTRODE
SP1X, SP1, SP1F, SP2F, SP2X, SP2 POWER FEEDING POINT

The invention claimed is:

1. An antenna module comprising:
a dielectric substrate;
a ground electrode on the dielectric substrate;
a first power feeding conductor and a second power feeding conductor, each having a flat plate shape and facing the ground electrode;
a first power feeding wiring configured to transmit a first radio frequency signal to a first power feeding point of the first power feeding conductor;
a second power feeding wiring configured to transmit a second radio frequency signal to a second power feeding point of the second power feeding conductor;
a third power feeding wiring configured to transmit a third radio frequency signal to a third power feeding point of the first power feeding conductor; and
a fourth power feeding wiring configured to transmit a fourth radio frequency signal to a fourth power feeding point of the second power feeding conductor, wherein
a frequency of a second radio wave radiated from the second power feeding conductor is greater than a frequency of a first radio wave radiated from the first power feeding conductor,
the first power feeding conductor is configured to radiate the first radio wave in a first polarization direction by the first radio frequency signal from the first power feeding wiring and to radiate a third radio wave in a second polarization direction by the third radio frequency signal from the third power feeding wiring,
the second power feeding conductor is configured to radiate the second radio wave in the first polarization direction by the second radio frequency signal from the second power feeding wiring, and to radiate a fourth radio wave in the second polarization direction by the fourth radio frequency signal from the fourth power feeding wiring, and
the second power feeding wiring comprises:
a first via at a ground electrode side of the second power feeding conductor, and at a position different than the second power feeding point as seen in a plan view of the dielectric substrate; and
a first wiring pattern connecting the first via and the second power feeding point, and the fourth power feeding wiring comprises:
a second via at the ground electrode side of the second power feeding conductor at a position different than the fourth power feeding point as seen in the plan view; and
a second wiring pattern that connects the second via and the fourth power feeding point, the first wiring pattern extends in the first polarization direction, and the second wiring pattern extends in the second polarization direction.

2. The antenna module according to claim 1, wherein the first wiring pattern is in a same layer of the dielectric substrate as the second power feeding conductor.

3. The antenna module according to claim 1, wherein:
the second power feeding conductor is in an inner layer of the dielectric substrate, and
the first wiring pattern is in a layer on a front surface side of the dielectric substrate relative to the second power feeding conductor in the dielectric substrate.

4. The antenna module according to claim 1, wherein when the dielectric substrate is seen in the plan view, the first via is located closer to a center of the dielectric substrate than the second power feeding point.

5. The antenna module according to claim 1, wherein:
the first power feeding conductor is between the second power feeding conductor and the ground electrode, and
the second power feeding wiring passes through the first power feeding conductor.

6. The antenna module according to claim 1, wherein the first power feeding conductor surrounds the second power feeding conductor in a same layer of the dielectric substrate as the second power feeding conductor.

7. The antenna module according to claim 1, further comprising a power feeding circuit configured to supply the first and second radio frequency signals to the first and second power feeding conductors, respectively.

8. A communication apparatus comprising the antenna module according to claim 1.

9. An antenna module comprising:
a dielectric substrate;
a ground electrode on the dielectric substrate;
a first power feeding conductor and a second power feeding conductor, each having a flat plate shape and facing the ground electrode;
a first power feeding wiring configured to transmit a first radio frequency signal to a first power feeding point of the first power feeding conductor;
a second power feeding wiring configured to transmit a second radio frequency signal to a second power feeding point of the second power feeding conductor;
a third power feeding wiring configured to transmit a third radio frequency signal to a third power feeding point of the first power feeding conductor; and
a fourth power feeding wiring configured to transmit a fourth radio frequency signal to a fourth power feeding point of the second power feeding conductor, wherein:
a frequency of a second radio wave radiated from the second power feeding conductor is greater than a frequency of a first radio wave radiated from the first power feeding conductor,
an inside of the second power feeding conductor comprises a slit and a protruding portion that protrudes inside the slit, and
the protruding portion is a part of the second power feeding wiring configured to transmit the second radio frequency signal to the second power feeding conductor.

10. The antenna module of claim 9, wherein
the first power feeding conductor is configured to radiate the first radio wave in a first polarization direction by the first radio frequency signal from the first power feeding wiring and to radiate a third radio wave in a second polarization direction by the third radio frequency signal from the third power feeding wiring, and
the second power feeding conductor is configured to radiate the second radio wave in the first polarization direction by the second radio frequency signal from the second power feeding wiring, and to radiate a fourth radio wave in the second polarization direction by the fourth radio frequency signal from the fourth power feeding wiring.

* * * * *